United States Patent Office 3,001,175
Patented Sept. 19, 1961

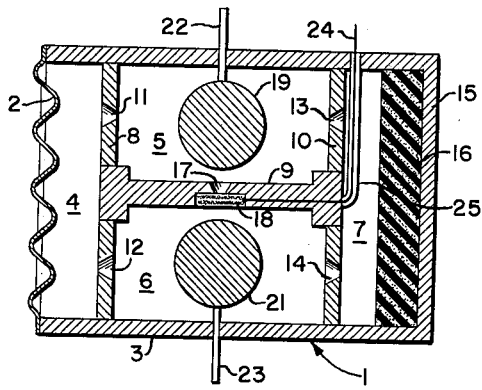
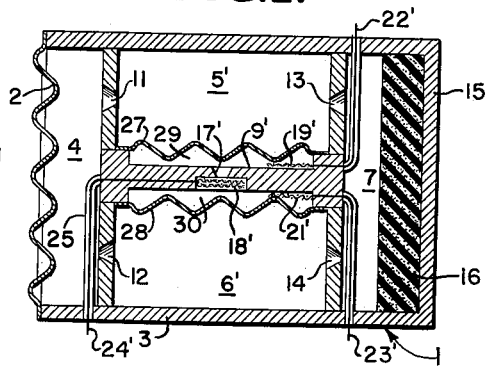
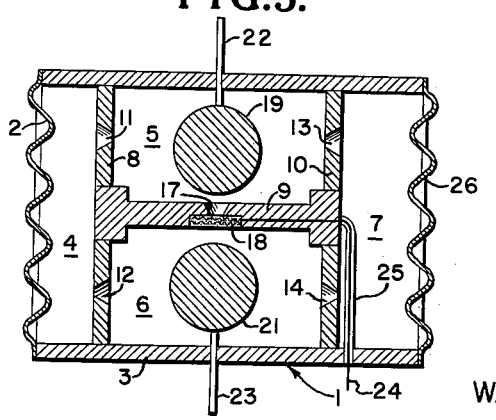

3,001,175
HYDRAULIC RECTIFYING BRIDGE CIRCUIT
Walter P. Christoph, Riverdale, Md., assignor to the United States of America as represented by the Secretary of the Navy
Filed Feb. 29, 1956, Ser. No. 568,683
7 Claims. (Cl. 340—13)
(Granted under Title 35, U.S. Code (1952), sec. 266)

The invention described herein may be manufactured and used by or for the Government of the United States of America for governmental purposes without the payment of any royalties thereon or therefor.

The invention relates to a hydraulic flowmeter device and more specifically to a system incorporating a hydraulic bridge rectifier in combination preferably with an oxidation reduction electrolytic detector whereby rectification of an alternating signal is achieved prior to the transduction of acoustic or fluid flow into electrical signal intelligence.

Prior systems for the detection of acoustic energy particularly in underwater applications have incorporated hydrophones or geophones for obtaining a first detection of the sound pressures in a body of water and thereafter transducing the signal into an electrical signal which varies in accordance with the changes of the applied signal. Such devices are relatively insensitive at very low frequencies and the low sensitivity to low frequency sound waves limits the usefulness of such systems. These systems may utilize an electro-magnetic type transducer or a crystal transducer of a well known character and are generally fed to electronic amplifying devices to raise the signal level to the useful power level for instrumentation or utilization or recording applications. The functions of the instant invention are not obtainable by the old methods and even the present electrolytic acoustic detectors used with this invention have a limited frequency range and are comparatively insensitive.

This invention incorporates a group of four hydraulic rectifiers disposed in a bridge arrangement to provide a full-wave type rectification for application to a highly sensitive electrolytic detector which as such is insensitive to alternating flow in the frequency range being considered. The hydraulic rectifiers are arranged in a manner to provide a unidirectional flow through the electrolytic detector. While hydraulic rectifiers are relatively inefficient they provide sufficient rectification for utilization in the instant application. The hydraulic rectifier, like the electrical analog thereof, is a device which offers two different impedances, in the instant case hydraulic impedances, depending on the direction of flow therethrough. The specific hydraulic rectifier utilized is not a subject of this invention and details of various hydraulic rectifying devices are set forth with greater particularity in the copending application of W. P. Christoph, S.N. 564,592, filed February 9, 1956, now U.S. Patent No. 2,856,962, issued October 21, 1958.

The rectifiers are arranged as aforesaid in a full-wave bridge arrangement with the acoustic signal being applied to alternate ones of the input rectifiers during alternate cycles of phase change. The oxidation reduction electrolytic detecting device is connected across the output of the bridge and is thereby subjected to a rectified acoustic pressure signal which represents the envelope of the acoustic intelligence applied to the rectifying detector network.

One object of this invention resides in the provision of means for adapting hydraulic flowmeter for detection of hydro-acoustic pressure signal intelligence.

Another object resides in the utilization of four hydraulic rectifiers in a bridge circuit arrangement with an acoustic detector for direct acoustic signal detection without requiring prior amplification thereof.

It is an additional object to provide hydraulic detector system for providing increased sensitivity over prior art flow detectors.

It is also an object of this invention to provide new and improved means for comparing two different but coherent sound signals and obtaining the difference between their amplitudes.

Another object of this invention resides in providing hydraulic rectifying system for use with a starved cathode oxidation reduction electrolytic detector cell whereby the derivative of the envelope of the acoustic transient signal may be taken.

Other objects and many of the attendant advantages of this invention will be readily appreciated as the same becomes better understood by reference to the following detailed description when considered in connection with the accompanying drawings wherein:

FIG. 1 is a generally diagrammatic showing of one embodiment of a bridge rectifier and electrolytic detector cell in which the detector cell is an integral portion of the structure providing the bridge arrangement; and wherein the sound signal is impressed upon a single diaphragm;

FIG. 2 is a generally diagrammatic illustration of a hydraulic bridge rectifying system of the character of FIG. 1 and utilizing an enclosed electrolytic detector cell; and FIG. 3 is a diagrammatic illustration of another embodiment of the invention in which the structure of the detector and bridge assembly is generally similar to FIG. 1 with the exception that the system is enclosed by a pair of diaphragms, one of which replaces a sponge rubber acoustic capacitance backing plate of FIG. 1.

Referring now to the drawings and more particularly to FIG. 1 there is shown diagrammatically a housing assembly generally indicated by the numeral 1 and enclosed by a flexible diaphragm 2 which is adapted to be subjected to sound pressure from an underwater source. The interior of the casing 3 is divided into a plurality of chambers 4, 5, 6 and 7 provided by partition members 8, 9 and 10. The partitions 8 and 10 which separate the outer chambers 4 and 7 respectively from intermediate chambers 5 and 6 are disposed in planes parallel to the diaphragm 2. The partition 9 is disposed in a transverse plane. Disposed in the partition wall 8 is a pair of conically concave orifices 11 and 12 disposed with the direction of greatest easy flow from chamber 4 to chamber 5 or chamber 6 to chamber 4, as the case may be. The partition or wall 10 is provided with a pair of conically concave orifices 13 and 14 with the direction of greatest flow resistance being from chambers 5 to 7 and chambers 7 to 6 respectively. Disposed against the back wall 15 of the casing 3 is a rubbery sponge 16 or other suitable acoustically compliant mass of material. The transverse partition 9 is provided with a cathode orifice at 17 and a cathode electrode 18 which together with the electrodes 19 and 21 disposed respectively in the chambers 5 and 6 provide a D.C. type oxidation reduction electrolytic detecting cell. The electrodes 19 and 21 have leads 22 and 23 respectively brought out to the exterior of the case while the cathode electrode 18 which may be in the form of a platinum wire mesh or the like is provided with a lead 24 which extends through an insulating plastic tube 25 or the like to the exterior of the casing.

Referring now to FIG. 3 there is shown a structure generally similar to that of FIG. 1 but differing therefrom in that the rear wall 15 and the acoustic material 16 has been replaced by a compliant diaphragm 26 whereby the bridge detecting system may be subjected to coherent sound energy from different sources applied respectively at the diaphragms 2 and 26 to compare and obtain a measure of the difference therebetween.

The structure of the embodiment of FIG. 2 incorporates a housing assembly generally similar to that of FIG. 1 but differing therefrom in that the electrodes 19' and 21' together with the cathode structure provided in the partition 9', and which comprises a cathode orifice 17' and the cathode electrode 20' are enclosed between a pair of diaphragms 27 and 28. The detecting cell chambers 29 and 30 of FIG. 2 are filled with a suitable oxidation reduction electrolyte solution of a character which is chemically non-reactive with the noble metallic electrodes and does not leach out impurities from the plastic diaphragms or structure of the cell partition and wall members and permits the use of any suitable acoustics fluid in chambers 4, 5', 6', and 7 which is of suitable acoustic impedance to be capable of transferring coupling signal intelligence impressed upon the diaphragm to the detector diaphragms 27 and 28.

In the operation of the cell and bridge structures of FIGS. 1 and 3 the entire interior of the cell is filled with a suitable electrolyte.

The functioning of the structure of a device FIG. 1 is as follows:

The alternating pressure signals initiated by an external sound source and transmitted by a sound conducting medium such, for example, as sea water, impinges on the diaphragm 2 which provides a coupling of the signal to the fluid in chamber 4 and causes an alternating flow between the volumes 4 and 7 due to the compliance of the back volume element 16. The quantity of flow and its distribution through the hydraulic network of the bridge depends essentially upon the absolute resistance values of the rectifiers 11, 12, 13 and 14 and the ratio of the hydraulic resistance to flow in the forward direction of flow and the hydraulic resistance to flow in the backward direction of flow. The positioning of the rectifiers as shown in FIG. 1 indicates the rectifiers 11 and 14 to be disposed in the preferred flow orientation for the positive phase of a sound signal impinging on the diaphragm 2 and causing flow through cathode orifice 17 to distend the compliant mass 16 while the rectifiers 13 and 12 are disposed in the non-preferred or higher resistance orientation direction of flow with respect to the positive phase input signal. The rectifiers 13 and 12 provide a similar unidirectional flow through cathode orifice 17 when a similar positive phase signal from compliance 16 is applied during the succeeding half cycle and when the negative phase signal is applied to the diaphragm 2.

The result of this configuration is such that the instantaneous pressure in the volume 5 will produce unidirectional electrolyte flow through the orifice 17 of the electrolytic detector cathode 18 thereby sweeping additional ions toward the cathode to provide a detected and transduced electrical signal output from the electrical circuit leads 22, 23 and 24. If now the phase of the input signal is reversed, the rectifiers in the preferred flow orientation are rectifiers 13 and 12 while rectifiers 11 and 14 are in the non-preferred orientation. Since the overall flow during the negative phase is from right to left the result is again that the instantaneous pressure in volume 5 is greater than that in volume 6 and an electrolyte flow is again produced through the starved ion zone of cathode orifice 17 and the ions of the increased flow are collected at the cathode element 20 which is normally maintained in an ionic starved condition by the application of a suitable D.C. bias potential across the electrodes of the cell; in a manner not shown. It being understood that the electrolytic cell operates in a manner similar to any known electrolytic detector cell, as for example, the cell disclosed in U.S. Patent No. 2,685,025 to Root. The flow thus continues during the time of the negative phase flow from the back volume chamber 7 to chamber 5 through orifice 17 to chamber 6. The arrangement of FIG. 1 thus has the properties of a full-wave rectifier providing a flow through the electrolytic cell cathode element which is exposed to a unidirectional flow. The frequency response of this device is a function only of the hydraulic elements and not of the electrolytic pick-up element. The purpose of the additional anode 21 which is electrically connected by electrical circuit lead 23 to a D.C. bias potential (not shown) outside the housing 3 to provide an initial bias and to condition the cell in a manner whereby less of the active ions are present in the area around the cathode than exist in the chambers 5 and 6, thereby maintaining the cathode in the "starved" condition. This may be accomplished by externally connecting circuit lead 22 electrically to circuit lead 23.

Since the structure of FIG. 1 is entirely filled with electrolyte it is essential that all structural parts which are exposed to the electrolyte solution be chemically inert to the electrolyte solution utilized therein.

Referring now to FIG. 3 a structure is shown which functions in substantially the same manner as that of FIG. 1 but differs therefrom in that the back volume has been replaced by the diaphragm 26 to permit the application of two coherent signals to the bridge. The diaphragm 2 and the rectifier orifices 11 and 14 are arranged in the direction of greatest easy flow for positive signal pulses at the diaphragm 2 and the rectifiers 13 and 12 are disposed to be in a preferred flow direction when the positive pulse is applied at diaphragm 26.

The embodiment of FIG. 2 functions in a manner generally similar to that of FIG. 1 but it provides an advantageous arrangement whereby either a direct detection of the signal, or a derivative function of the applied signal, may be obtained therefrom. In this embodiment the electrolytic detector cell is disposed within a cell unit between the chambers 5' and 6' and is enclosed by diaphragms 27 and 28, in a manner whereby the balance of the structure of the rectifying bridge other than the part enclosed by the diaphragms 27 and 28 need not be of a material which is chemically inert to the electrolyte enclosed in chambers 29 and 30. The time constant of the electrolytic detector cell is determined by the compliance of the acoustic capacitance elements comprised of diaphragms 27 and 28 or bellows devices if used in lieu of diaphragms together with the hydraulic resistance of the cathode orifice 17'. If a signal pulse which is of sufficient amplitude for detection is applied to the diaphragm 2 and communicated to the diaphragm 27 and if it is of longer duration than the time constant of the compliance of the diaphragm and the resistance of the cathode, which may be conveniently thought of as an hydraulic RC circuit composed of the diaphragm and cathode resistance, the output of the cell will be a derivative function of the applied signal. If, however, the duration of the signal pulse is shorter than the RC time constant of the detector cell the output will be a direct function of the applied input signal.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An underwater sound detection device of the character disclosed comprising, in combination, a plurality of hydraulic conducting elements each providing a preferred direction of fluid flow and connected in a rectifying bridge arrangement, means including a compliant member for applying hydro-acoustic signals to the input of said bridge, and means including an electrolytic detector connected across the output of said bridge circuit for providing a unidirectional electrical current output in response to unidirectional fluid flow in said bridge.

2. A sound detection system of the character disclosed comprising an electrolytic detecting cell having an exteriorly connected cathode for providing a unidirectional electrical current output in response to electrolyte flow therein, and a plurality of hydraulic rectifier elements disposed in a full-wave bridge relationship defining an input arrangement connected to said cell for maintaining a unidirectional pulsating flow of electrolyte therethrough.

3. A hydraulic input and detector circuit for detecting and transducing hydro-acoustic signal intelligence into a unidirectional electrical current output which comprises a housing assembly, a fluid substantially filling said housing assembly, diaphragm means for closing said housing, partition means providing a plurality of fluid chambers in said housing, a plurality of conducting orifice devices having a preferred direction of flow and disposed in the partitions of the said housing assembly which provides said chambers, said orifice devices being disposed in a full-wave bridge rectifier arrangement, and a fluid flow detection and electrical output oxidation reduction cell connected across the output of the full-wave bridge rectifier circuit formed by said orifice devices for providing an electrical output signal correlative to the application of hydro-acoustic signals to the input of said bridge arrangement at said diaphragm means.

4. An underwater sound detecting device of the character disclosed comprising a housing, means including at least one diaphragm for closing said housing, a pair of partition walls in said housing disposed in parallel relation to said diaphragm means and in mutually spaced relationship therefrom, a compliant mass disposed adjacent said means for closing said housing at the end remote from said diaphragm thereof, a transverse partition disposed to divide the volume between said pair of partition walls into a pair of intermediate fluid chambers, a plurality of hydraulic rectifying orifice devices disposed in a full-wave bridge circuit relation, a first of said rectifying orifice devices being disposed to provide a preferred direction of fluid communication between a first chamber provided by said diaphragm and a first of said walls and a first one of said pair of intermediate chambers, a second rectifying orifice device disposed in the second of said walls and remote from said first wall and providing fluid communication between said first intermediate volume and a fourth volume adjacent said compliant mass, a third rectifying orifice device disposed in said first wall to provide fluid flow from the second of said intermediate volumes in a preferred direction to the first chamber and a fourth orifice device disposed to provide fluid flow in a preferred direction from said second intermediate chamber to the said fourth chamber, an electrode in each of said intermediate chambers connected together externally of said detecting device, and a cathode orifice means disposed in said transverse wall and providing a preferred direction of fluid communication from the first to the second of said intermediate chambers, a cathode disposed in said transverse partition and in fluid flow communication with said cathode orifice.

5. A bridge rectifying system of the character of claim 4 for providing a transduction of fluid flow signals passed through said full-wave rectifier into electric signals, as provided by the detecting elements comprising said electrodes and said cathode, and wherein an oxidation-reduction electrolyte solution substantially fills said housing.

6. The structure of claim 4 further including a pair of diaphragms disposed at opposite sides of said transverse partition, an electrolyte solution having oxidation-reduction properties being contained by said pair of diaphragms, and a fluid providing a suitable acoustic impedance to provide a coupling from said first diaphragm to the diaphragms adjacent said transverse walls substantially filling the balance of said housing.

7. A device according to the structure of claim 4 wherein the compliant means for closing the casing at the end remote from said first named diaphragm is a second compliant diaphragm.

References Cited in the file of this patent
UNITED STATES PATENTS

| | | |
|---|---|---|
| 2,220,098 | Guanella | Nov. 5, 1940 |
| 2,661,430 | Hardway | Dec. 1, 1953 |
| 2,769,929 | Hardway | Nov. 6, 1956 |
| 2,782,394 | Hardway | Feb. 19, 1957 |